(12) United States Patent
Kang et al.

(10) Patent No.: US 8,340,214 B2
(45) Date of Patent: Dec. 25, 2012

(54) METHOD AND APPARATUS FOR GENERATING PREDISTORTION SIGNAL

(75) Inventors: Minsoo Kang, Daejeon (KR); Woo-Jin Byun, Daejeon (KR); Kwang-Seon Kim, Daejeon (KR); Bong-Su Kim, Daejeon (KR); Tae-Jin Chung, Daejeon (KR); Myung-Sun Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 672 days.

(21) Appl. No.: 12/546,528

(22) Filed: Aug. 24, 2009

(65) Prior Publication Data

US 2010/0158154 A1 Jun. 24, 2010

(30) Foreign Application Priority Data

Dec. 22, 2008 (KR) ........................ 10-2008-0131179

(51) Int. Cl.
*H04K 1/02* (2006.01)
*H04L 25/03* (2006.01)
*H04L 25/49* (2006.01)

(52) U.S. Cl. ......... 375/297; 375/232; 375/285; 375/296

(58) Field of Classification Search ................. 375/221, 375/295–297, 229–232, 259, 285
See application file for complete search history.

(56) References Cited

U.S. PATENT DOCUMENTS

| 6,614,854 | B1* | 9/2003 | Chow et al. .................... 375/297 |
| 6,677,870 | B2 | 1/2004 | Im et al. |
| 2003/0197558 | A1* | 10/2003 | Bauder et al. ................. 330/149 |
| 2003/0199264 | A1* | 10/2003 | Holenstein et al. ........... 455/324 |
| 2007/0237260 | A1 | 10/2007 | Hori et al. |

FOREIGN PATENT DOCUMENTS

KR 10-2007-0031452 A 3/2007

OTHER PUBLICATIONS

Shinji Mizuta, "A New Adjustment Method for the Frequency-Dependent IMD Compensator of the Digital Predistortion Linearizer", IEEE Xplore, 2006, pp. 255-258, Japan.

* cited by examiner

*Primary Examiner* — David C. Payne
*Assistant Examiner* — James M Perez

(57) ABSTRACT

Provided is a digital predistortion linearizer applicable to millimeter-wave band point-to-point communications. The digital predistortion linearizer includes a transmission unit and a reception unit. The reception unit receives a first signal including a transmission signal and a distortion signal through a millimeter-wave propagation environment, detects the distortion signal from the first signal, and transmits information on the detected distortion signal with the first signal to the transmission unit. The transmission unit generates a predistortion signal using the information on the distortion signal and the first signal received from the reception unit, couples the generated predistortion signal with the transmission signal, and outputs the coupled signal.

13 Claims, 3 Drawing Sheets

METHOD AND APPARATUS FOR GENERATING PREDISTORTION SIGNAL

CROSS-REFERENCE TO RELATED PATENT APPLICATION

This application claims the benefit of Korean Patent Application No. 10-2008-0131179, filed on Dec. 22, 2008, in the Korean Intellectual Property Office, the disclosure of which is incorporated herein in its entirety by reference.

BACKGROUND OF THE INVENTION

1. Field of the Invention

The present invention relates to a digital predistortion linearizer applicable to millimeter-wave band point-to-point communications.

2. Description of the Related Art

Current communication systems have been developed in a way that more and more information is transmitted. In order to improve spectral efficiency, digital modulation systems have become much more complicated than the past. A simple on-off keying (OOK) modulation that has been conventionally applied to millimeter-wave point-to-point communication systems has been developed to a high spectral efficiency modulation such as quadrature phase shift keying (QPSK), 8-phase shift keying (8PSK), 16-quadrature amplitude modulation (16QAM), etc.

However, in the high spectral efficiency modulation, a ratio between a maximum power and an average power of a transmission signal is greater than 10 dB. Thus, in order to transmit a signal without distortion, a transmission power amplifier at a front-end of an antenna is required to have a power greater than a desired level.

To decrease the ratio between the maximum power and the average power of the transmission signal, a method of reducing distortion of a signal by reducing the maximum power of the transmission power amplifier and using a linearization circuit has been mainly used.

The linearization of a power amplifier may include a method of using a feedback circuit, a feed forward method including extracting an out-of-phase component of generated distortion, amplifying the out-of-phase component using a sub-amplifier, and coupling the amplified component with a signal output from a main-amplifier to offset the distortion, and a predistortion linearization including pre-generating a distortion signal, applying the distortion signal to an input signal, and offsetting the distortion in an amplifier while the signal passes through the amplifier.

SUMMARY OF THE INVENTION

The present invention provides a method and apparatus for generating a predistortion signal using millimeter-wave band characteristics. Accordingly, a transmission power amplifier at a front-end of an antenna having a power greater than a desired level is not required in order to transmit a signal without distortion in a high spectral efficiency modulation.

A millimeter-wave band propagation environment according to the present invention does not include fading components. According to the present invention, a distortion of a transmission unit may be extracted using a reception signal of a reception unit without using an additional detecting circuit for the extraction of the distortion of the transmission unit. Thus, the size of the millimeter-wave band apparatus may be decreased.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
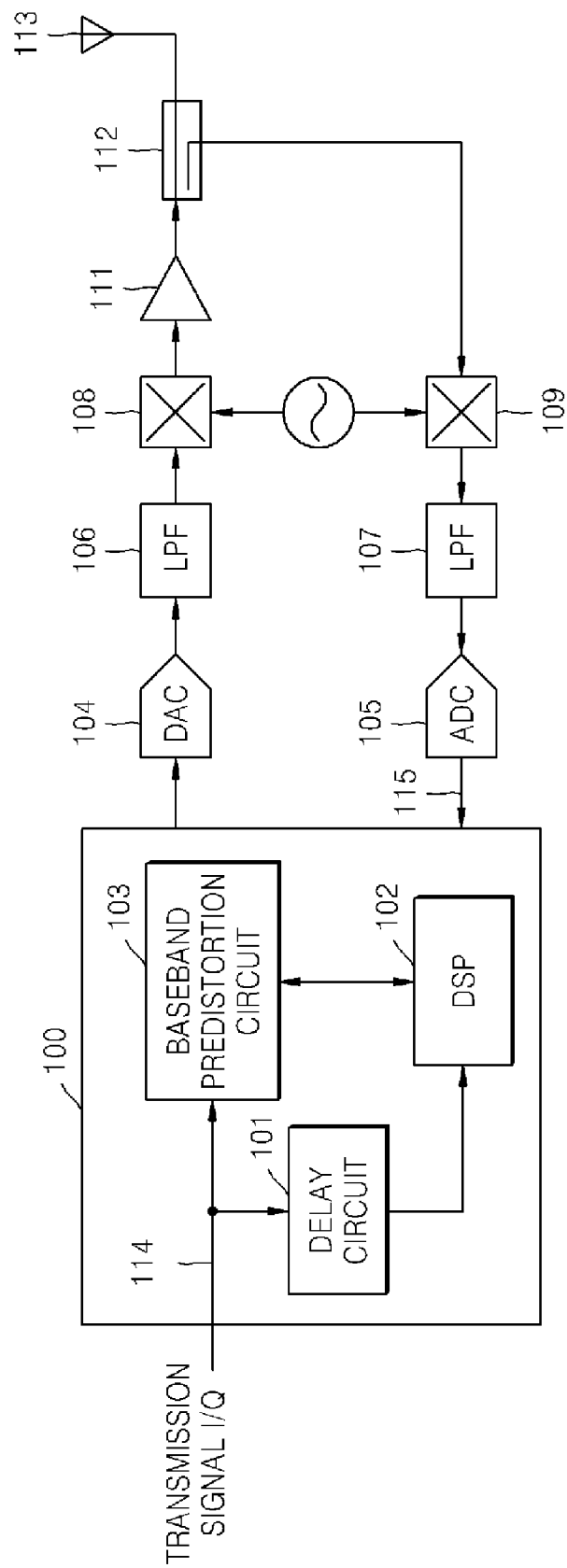
FIG. 1 illustrates the configuration of a conventional digital predistortion linearizer.

The present invention will now be described more fully with reference to the accompanying drawings, in which exemplary embodiments of the invention are shown.

According to an embodiment of the present invention, there is provided a digital predistortion linearizer including a transmission unit and a reception unit, wherein the reception unit receives a first signal including a transmission signal transmitted from the transmission unit and a distortion signal generated in the transmission unit through a millimeter-wave propagation environment, detects the distortion signal from the first signal, and transmits information on the detected distortion signal with the first signal to the transmission unit, and the transmission unit generates a predistortion signal using the information on the distortion signal and the first signal received from the reception unit, couples the generated predistortion signal with the transmission signal, and outputs the coupled signal.

The first signal received by the reception unit may be formed by frequency up-converting a transmission signal input to the transmission unit, converting the frequency up-converted signal to a millimeter-wave band signal, and amplifying the millimeter-wave band signal.

The distortion signal may be generated during the amplification of the millimeter-wave band signal.

The predistortion signal may be generated by adjusting a phase of the initial transmission signal input to the transmission unit to a phase of the first signal by delaying the initial transmission signal, and removing the initial transmission signal.

According to another embodiment of the present invention, there is provided a method of generating a predistortion signal in a digital predistortion linearizer including a transmission unit and a reception unit, the method including: in the transmission unit, transmitting a first signal formed by converting a digital transmission signal to an analog baseband signal, filtering the analog baseband signal with a low pass filter, and amplifying the filtered signal; in the reception unit, receiving the first signal, amplifying the first signal, and converting the amplified signal to an analog baseband signal, and transmitting the analog baseband signal to the transmission unit; in the transmission unit, receiving the analog baseband signal, converting the analog baseband signal to a digital signal, and detecting a distortion signal generated in the transmission unit from the converted first signal; and in the transmission unit, comparing the first signal including the detected distortion signal with the digital transmission signal to generate a predistortion signal.

According to another embodiment of the present invention, there is provided a method of generating a predistortion signal in a digital predistortion linearizer including a transmission unit and a reception unit, the method including: in the reception unit, receiving a first signal including a transmission signal transmitted from the transmission unit and a distortion signal generated in the transmission unit through a millimeter-wave propagation environment; in the reception unit, detecting the distortion signal from the first signal, and transmitting information on the detected distortion signal with the first signal to the transmission unit; in the transmission unit, generating a predistortion signal using the information on the distortion signal and the first signal received from the reception unit; and in the transmission unit, coupling the generated predistortion signal and the transmission signal, and outputting the coupled signal.

The present invention will now be described hereafter completely with reference to the accompanying drawings, in which exemplary embodiments of the invention are shown. In the drawings, like reference numerals denote like elements. While describing the present invention, detailed descriptions about either related well-known functions or configurations that may diminish the clarity of the present invention are omitted.

FIG. 1 illustrates the configuration of a conventional digital predistortion linearizer.

An initial baseband signal I/Q 114 is converted to an analog signal by a digital-to-analog converter 104, filtered by a low pass filter 106 to remove high-level components, coupled with a signal generated in a local oscillator 333, and frequency-modulated by an up converter 108. Then, the frequency-modulated signal is amplified by a power amplifier 111 and output via an antenna 1 13.

The signal emitted via the antenna 113 is extracted by a directional coupler 112 and demodulated into the baseband signal by a down converter 109. The demodulated signal is filtered by a low pass filter 107 to remove high-level components, the filtered signal is converted into a digital signal 115 via an analog-to-digital converter 105, and the digital signal 115 is applied to a digital predistortion generator 100.

The digital signal 115 includes distortion generated while the initial baseband signal 114, which is not processed in the digital predistortion generator 100, is processed in the power amplifier 111.

The digital predistortion generator 100 of FIG. 1 extracts the generated distortion of the digital signal 115.

The digital predistortion generator 100 of FIG. 1 may include a digital signal processor (DSP) 102, a delay circuit 101, and a baseband predistortion circuit 103.

The initial baseband signal 114 is processed in the delay circuit 101 and compared with the digital signal 115 including distortion in the DSP 102. The comparison result is applied to the digital predistortion circuit 103 to finally generate the initial baseband signal coupled with the predistortion signal, and the coupled signal is applied to the digital-to-analog converter 104.

The applied signal passes through the low pass filter 106, the up converter 108, and the power amplifier 111. Since the applied signal includes predistortion generated at baseband predistiontion circuit, the linearity of the PA111 is increased by compensation between predistortion generated at baseband presistiontion circuit 103 and distortion generated at PA 111 However, the linearization of the digital predistortion is easily performed in low frequency bands, however not easily performed in millimeter-wave bands. Since components of the millimeter-wave band are expensive, the costs for radio frequency (RF) components, the up converter 108, the power amplifier 111, the directional coupler 112, and the down converter 109, used in the linearization system increase.

The manufacturing costs may decrease using the digital predistortion linearization according to the present invention.

Figure 2:
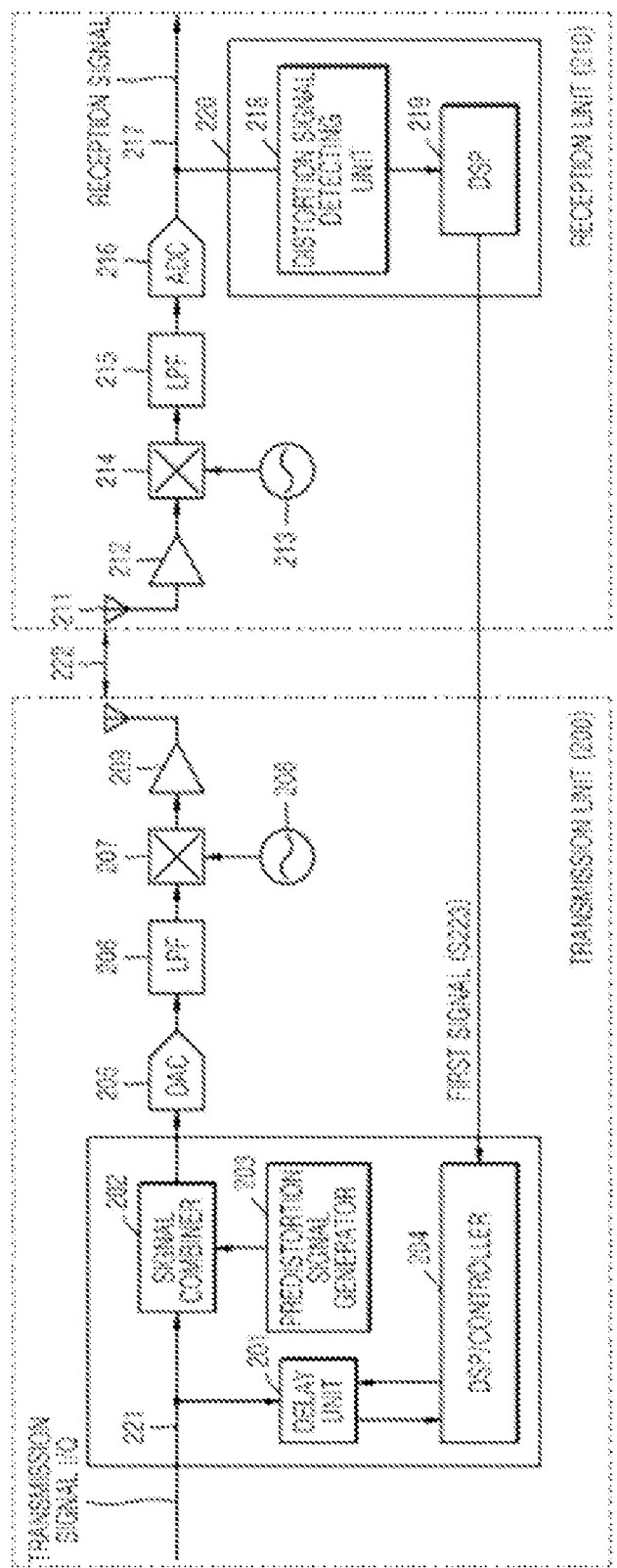
FIG. 2 illustrates the configuration of a millimeter-wave band digital predistortion linearizer according to an embodiment of the present invention.

FIG. 2 illustrates the configuration of a millimeter-wave band digital predistortion linearizer according to an embodiment of the present invention.

The millimeter-wave band digital predistortion linearizer includes a transmission unit 200 and a reception unit 210.

The reception unit 210 receives a first signal including a transmission signal transmitted from the transmission unit 200 and a distortion signal generated in the transmission unit 200 through a millimeter-wave propagation environment 222. Then, the reception unit 210 detects the distortion signal from the first signal and transmits information on the detected distortion signal with the first signal to the transmission unit 200.

The transmission unit 200 generates a predistortion signal using the information on the distortion signal and the first signal received from the reception unit 210, couples the generated predistortion signal and the transmission signal, and outputs the coupled signal.

The transmission unit 200 and the reception unit 210 will be described in more detail. In the transmission unit 200, a digital transmission signal I/Q 221 passes through a signal coupler 202 and a digital-to-analog converter 205 where the digital transmission signal I/Q 221 is converted to an analog signal. Then, the analog signal passes through a low pass filter 206 where high-level components are filtered. Then, the filtered signal is converted to a radio frequency (RF) signal by a converter 207 according to a signal generated in a transmitter local oscillator 208. The RF signal is amplified from passing through a power amplifier 209, and the amplified RF signal is output by a transmission antenna 210. The output signal of the transmission antenna 210 includes distortion generated from the RF signal passing through the power amplifier 209.

The signal output from the transmission antenna 210 passes through the millimeter-wave propagation environment 222 and is input to the reception unit 210 via a reception antenna 211 included in the reception unit 210. The millimeter-wave propagation 222 has its own peculiarities. In order to use the millimeter-wave bands. Line of Sight (LOS) connections are required. In millimeter-wave propagation, the millimeter-wave propagation is rarely affected by fading. Thus, the propagation model of the millimeter-wave propagation environment 222 may be represented by the amount of decrease of signal attenuation with respect to distance The signal input to the reception antenna 211 is amplified from passing through a low noise amplifier 212 and converted to a baseband signal by a converter 214 according to a signal generated in a receiver local oscillator 213. The baseband signal passes through a low pass filter 215 where unwanted frequency components are filtered. Then, the filtered signal is converted into a digital signal by an analog-to-digital converter 216. The digital signal is applied to a reception distortion signal detecting unit 220. While the digital signal passes through a distortion signal detecting unit 218, distortion generated by the power amplifier 209 in the transmission unit 200 is detected from the initial transmission signal 221. The detected distortion signal is transmitted to a DSP 219 of the reception unit 210, datarized, and transmitted to the transmission unit 200 (S223).

The signal transmitted to the transmission unit 200, with information on the distortion signal, is input to a DSP/control unit 204, as a first signal, In the DSP/control unit 204, the first signal transmitted from the reception unit 210 is compared with the initial transmission signal I/Q 221. In this regard, the phase of the initial transmission signal I/Q 221 is adjusted to that of the first signal by a delay unit 201. Then, a predistortion signal generator 203 removes the initial transmission signal I/Q 221 using the phase-adjusted signals and generates a predistortion signal.

The generated predistortion signal is coupled with the initial transmission signal I/Q 221 by the signal coupler 202.

Figure 3:
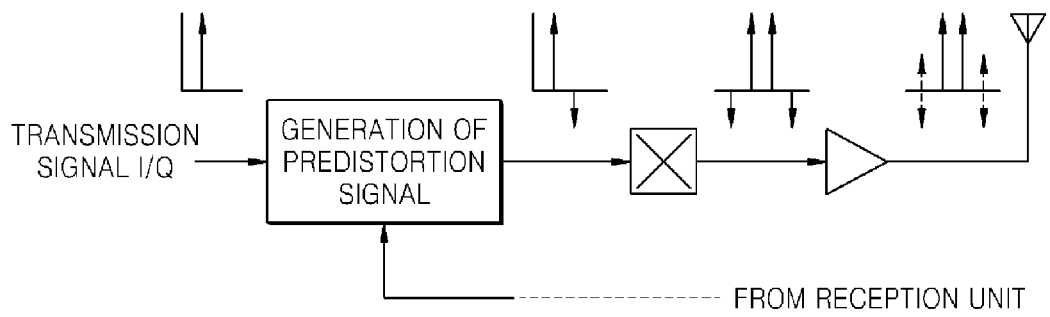
FIG. 3 illustrates the millimeter-wave band digital predistortion linearizer of FIG. 2 from a signal-source point of view.

FIG. 3 illustrates the millimeter-wave band digital predistortion linearizer of FIG. 2 from a signal-source point of view.

Figure 4:
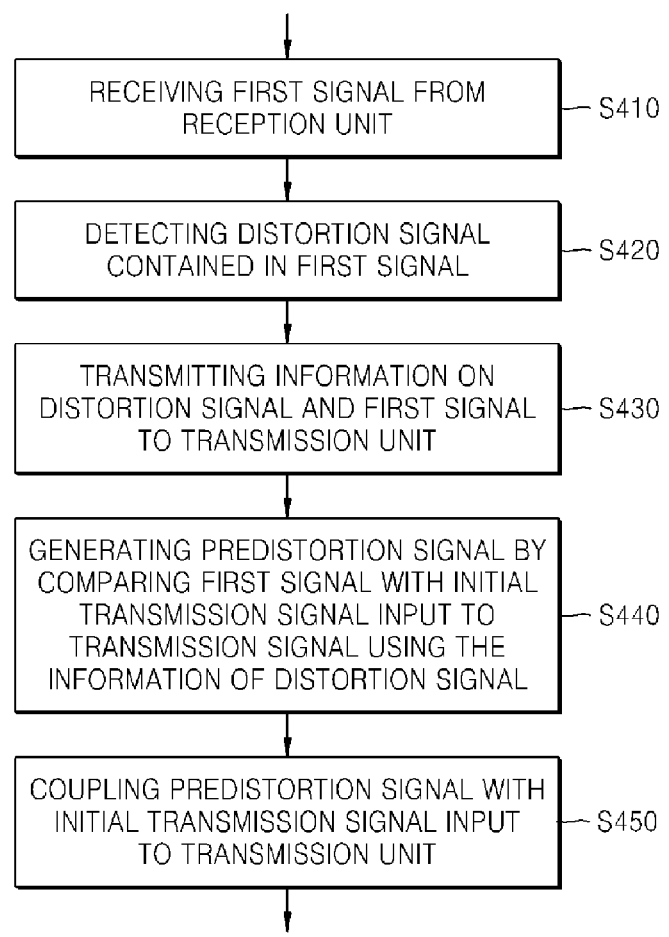
FIG. 4 is a flowchart of the generation of a predistortion signal by a digital predistortion linearizer including a transmission unit and a reception unit, according to an embodiment of the present invention.

FIG. 4 is a flowchart of the generation of a predistortion signal by a digital predistortion linearizer including a transmission unit and a reception unit, according to an embodiment of the present invention.

A reception unit receives a first signal including a transmission signal transmitted from a transmission unit and a distortion signal generated in the transmission unit through a millimeter-wave propagation environment (S410). The transmission signal input to the transmission unit is frequency up-converted, converted to a millimeter-wave band signal, and amplified to be the first signal. In this regard, distortion is generated, in addition to the initial transmission signal, while the transmission signal passes through a power amplifier, the power amplifier 209 shown in FIG. 2.

The reception unit, which receives the first signal from the transmission unit through the millimeter-wave propagation environment, detects the distortion signal (S420). For this, the reception unit detects the distortion signal from the first signal by frequency down-converting the first signal, converting the frequency down-converted signal to a baseband analog signal, and reconverting the baseband analog signal to a digital signal. Then, information on the detected distortion signal is datarized and transmitted with the first signal to the transmission unit (S430).

The transmission unit compares the first signal with the initial transmission signal input to the transmission unit using the information on the distortion signal received from the reception unit, and generates a predistortion signal (S440). The phase of the initial transmission signal input to the transmission unit is adjusted to that of the first signal received from the reception unit by delaying the initial transmission signal, and the initial transmission signal is removed to generate a predistortion signal. Then, the generated predistortion signal is coupled with the initial transmission signal, and the coupled signal is output (S450).

The present invention provides a millimeter-wave band digital predistortion linearizer that uses special characteristics of millimeter-wave band propagation environment. In a conventional digital predistortion linearizer, a power detecting unit is disposed in a transmission unit. However, according to the present invention, a millimeter-wave band linearizer may be inexpensively fabricated using a reception unit. In addition, a digital predistortion linearizer is inexpensively fabricated, excellent transmission quality may be maintained by inhibiting distortion by a power amplifier, and power consumption may be reduced even though power efficiency is increased.

In addition, other embodiments can also be embodied as computer readable code on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Furthermore, the processing element could include a processor or a computer processor, and processing elements may be distributed and/or included in a single device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital predistortion linearizer comprising a transmission unit and a reception unit,
    wherein the reception unit receives a first signal comprising a transmission signal transmitted from the transmission unit and a distortion signal generated in the transmission unit through a millimeter-wave propagation environment, detects the distortion signal from the first signal, and transmits information on the detected distortion signal with the first signal to the transmission unit,
    the transmission unit generates a predistortion signal using the information on the distortion signal and the first signal received from the reception unit, couples the generated predistortion signal with the transmission signal, and outputs the coupled signal, and
    wherein the predistortion signal is generated by adjusting the phase of an initial transmission signal input to the transmission unit to the phase of the first signal by delaying the initial transmission signal, and removing the initial transmission signal.

2. The digital predistortion linearizer of claim 1, wherein the first signal received by the reception unit is formed by frequency up-converting the transmission signal input to the transmission unit, converting the frequency up-converted signal to a millimeter-wave band signal, and amplifying the millimeter-wave band signal.

3. The digital predistortion linearizer of claim 2, wherein the distortion signal is generated during the amplification of the millimeter-wave band signal.

4. The digital predistortion linearizer of claim 1, wherein the millimeter-wave propagation environment is rarely affected by fading and is defined by a linear function of signal attenuation with respect to distance.

5. The digital predistortion linearizer of claim 1, wherein the reception unit detects the distortion signal from the first signal by frequency down-converting the first signal, converting the frequency down-converted signal to a baseband analog signal, and reconverting the baseband analog signal to a digital signal.

6. A method of generating a predistortion signal in a digital predistortion linearizer comprising a transmission unit and a reception unit, the method comprising:
    in the transmission unit, transmitting a first signal, wherein the first signal is formed by converting a digital transmission signal to an analog baseband signal, filtering the analog baseband signal by a low pass filter, and amplifying the filtered signal;
    in the reception unit, amplifying the received first signal, and converting the amplified signal to an analog baseband signal;

in the reception unit, receiving the analog baseband signal, converting the analog baseband signal to a digital signal, and detecting a distortion signal generated in the transmission unit from the converted digital signal of the first signal: and in the transmission unit, comparing the first signal comprising the detected distortion signal to the digital transmission signal and generating the predistortion signal, wherein the predistortion signal is generated by adjusting the phase of the digital transmission signal input to the transmission unit to the phase of the first signal by delaying the phase of the digital transmission signal, and removing the digital transmission signal from the first signal, and wherein the first signal is transmitted to the reception unit through a millimeter-wave propagation environment.

7. The method of claim 6, wherein the millimeter-wave propagation environment is rarely affected by fading and is defined by a linear function of signal attenuation with respect to distance.

8. The method of claim 6, wherein the distortion signal is generated during the amplification of the signal in the transmission unit.

9. A method of generating a predistortion signal in a digital predistortion linearizer comprising a transmission unit and a reception unit, the method comprising:

in the reception unit, receiving a first signal comprising a transmission signal transmitted from the transmission unit and a distortion signal generated in the transmission unit through a millimeter-wave propagation environment;

in the reception unit, detecting the distortion signal from the first signal, and transmitting information on the detected distortion signal with the first signal to the transmission unit;

in the transmission unit, generating the predistortion signal using the information on the distortion signal and the first signal received from the reception unit; and in the transmission unit, coupling the generated predistortion signal and the transmission signal, and outputting the coupled signal, wherein the predistortion signal is generated by adjusting the phase of the transmission signal input to the transmission unit to the phase of the first signal by delaying the phase of the initial transmission signal, and removing the initial transmission signal.

10. The method of claim 9, wherein the first signal received by the reception unit is formed by frequency up-converting the transmission signal input to the transmission unit, converting the frequency up-converted signal to a millimeter-wave band signal, and amplifying the millimeter-wave band signal.

11. The method of claim 10, wherein the distortion signal is generated during the amplification of the millimeter-wave band signal.

12. The method of claim 9, wherein the millimeter-wave propagation environment is rarely affected by fading and is defined by a linear function of signal attenuation with respect to distance.

13. The method of claim 9, wherein the reception unit detects the distortion signal from the first signal by frequency down-converting the first signal, converting the frequency down-converted signal to a baseband analog signal, and reconverting the based analog signal to a digital signal.

* * * * *